United States Patent
Cohard

(10) Patent No.: US 9,877,090 B2
(45) Date of Patent: Jan. 23, 2018

(54) NETWORK CABLE COMPRISING A VISUAL MARKING DEVICE AND A DEVICE FOR VISUAL MARKING OF THE END OF A NETWORK CABLE

(71) Applicant: BULL SAS, Les Clayes sous Bois (FR)

(72) Inventor: Sylvain Cohard, Grenoble (FR)

(73) Assignee: BULL SAS, Les Clayes sous Bois (FR)

( * ) Notice: Subject to any disclaimer, the term of this patent is extended or adjusted under 35 U.S.C. 154(b) by 0 days.

(21) Appl. No.: 15/030,762

(22) PCT Filed: Oct. 20, 2014

(86) PCT No.: PCT/FR2014/052663
§ 371 (c)(1),
(2) Date: Apr. 20, 2016

(87) PCT Pub. No.: WO2015/059393
PCT Pub. Date: Apr. 30, 2015

(65) Prior Publication Data
US 2016/0269807 A1    Sep. 15, 2016

(30) Foreign Application Priority Data

Oct. 22, 2013 (FR) .................................... 13 60280

(51) Int. Cl.
*H04B 10/25* (2013.01)
*H04Q 11/00* (2006.01)
(Continued)

(52) U.S. Cl.
CPC ..... *H04Q 11/0005* (2013.01); *H04B 10/2504* (2013.01); *H04B 10/502* (2013.01);
(Continued)

(58) Field of Classification Search
CPC . H04B 10/502; H04B 10/806; H04B 10/2504
See application file for complete search history.

(56) References Cited

U.S. PATENT DOCUMENTS 5,463,706 A   10/1995  Dumont et al.
5,666,453 A    9/1997  Dannenmann
(Continued)

FOREIGN PATENT DOCUMENTS

EP    1 261 889 B1   5/2006
EP    1 788 825 A2   5/2007
(Continued)

OTHER PUBLICATIONS

International Search Report, dated May 6, 2015, from corresponding PCT Application.

*Primary Examiner* — Dzung Tran
(74) *Attorney, Agent, or Firm* — Young & Thompson

(57) ABSTRACT

A network cable (20) including wires intended to convey network electrical power and a device for visual identification of the ends of the cable, the device includes a first electronic circuit (101) having a light-emitting diode (11), a switch (12) and a second electronic circuit (102) having at least one light-emitting diode (21); both circuits being connected via a conductive link (103); the electronic circuits being arranged so that activation of the switch (12) allows the network power source to power at least the light-emitting diode of the electronic circuit of opposite end.

18 Claims, 2 Drawing Sheets

(51) Int. Cl.
*H04Q 1/02* (2006.01)
*H04B 10/50* (2013.01)
*H04B 10/80* (2013.01)

(52) U.S. Cl.
CPC .......... *H04B 10/806* (2013.01); *H04Q 1/136* (2013.01); *H04Q 2011/0039* (2013.01)

(56) References Cited

U.S. PATENT DOCUMENTS

| | | | |
|---|---|---|---|
| 6,297,787 B1 * | 10/2001 | Nishida | G06F 3/1446 345/1.3 |
| 6,577,243 B1 | 6/2003 | Dannenmann et al. | |
| 2003/0152344 A1 | 8/2003 | Brunet et al. | |
| 2006/0057876 A1 * | 3/2006 | Dannenmann | G01R 31/041 439/173 |
| 2008/0123323 A1 | 5/2008 | Brunet | |
| 2010/0210134 A1 * | 8/2010 | Caveney | H04Q 1/149 439/490 |
| 2010/0289416 A1 * | 11/2010 | Yeh | H05B 33/0803 315/192 |
| 2014/0362574 A1 * | 12/2014 | Barrett | F21S 2/00 362/249.03 |

FOREIGN PATENT DOCUMENTS

| | | |
|---|---|---|
| WO | 94/19702 A1 | 9/1994 |
| WO | 02/052583 A | 7/2002 |
| WO | 2008/071867 A2 | 6/2008 |

* cited by examiner

NETWORK CABLE COMPRISING A VISUAL MARKING DEVICE AND A DEVICE FOR VISUAL MARKING OF THE END OF A NETWORK CABLE

BACKGROUND OF THE INVENTION

FIELD OF THE INVENTION

The invention concerns a network cable comprising a device intended for visual identification of the ends of said cable.

The term "network cable" such as used in the present invention relates to cables or leads containing electrically conductive wires some intended to convey signals and others conveying power in accordance with the POE standard (Power Over Ethernet) or standard IEEE 802.3af. Such cables are used for electrical or computer cabling in computer or telephone networks. In computer cabling applications, the cables are formed of conductive wires in twisted pairs.

The invention more particularly concerns a network cable visual identification device intended for fast, unambiguous identification or marking of the ends of said cables facilitating all service operations. This fast identification is all the more essential since the cables form groups of cables connected to items of equipment arranged side by side and/or superimposed in so-called network cabinets or bays where the cables are generally intermingled.

The invention applies to the cabling of electrical, computer, telephone networks and in particular to so-called network cabinets for computer links.

More particularly, with regard to computer link network cabinets, a large number of plugging cables are passed between active computer equipment and plugging panels and form more or less intermingled bundles of cables. It is therefore very difficult to follow a cable over its entire length from one of its ends to find the other end and hence be able to match a connector of a given number within the distribution cabling with a port number of an active item of equipment.

Therefore, when cable bundles are assembled and connected a recurrent practical problem arises i.e. the certain identification, from knowledge of the position of one end of a cable, of the position of the other end from among all the cables in the bundle. This problem is regularly encountered with computer plugging cables/leads housed in a cabinet (or bay), but also with telephone jumper cables or electrical cabling whether the wires convey data signals or transfer power.

DESCRIPTION OF THE RELATED ART

Identification via visual marking facilitates installation and maintenance operations.

Several solutions exist at the present time which unfortunately are not satisfactory.

Among known solutions mention can be made of solutions for which the cable or connector structure at the end of the cable is not modified. These are the following techniques:

- physical and visual cable following by touch which proves to be highly difficult when cables are numerous and almost impossible if they are interlaced or tightly bound, in addition to the fact that this technique can be time-consuming;
- marking of the cables at the two ends by labelling. Unfortunately, this solution does provide for rapid identification of the desired cable end since all the cables have to be examined until the right one is found, said identification being costly in terms of time and not always easy to carry out;
- marking using different colours for each cable, but this technique proves to be quantitatively limited since the maximum number of available colours is generally insufficient, this number only being ten or so.

Other solutions require changes to the cables and/or connectors and include the solutions put forward in the following documents:

- In one variant described page 12, lines 9 to 15 in document WO94019702, visual identification is obtained by means of an optical fibre. The optical fibre is inserted in the cable and has one end that is curved over. This end is used to release light injected into the optical fibre and transmitted therein. Light is released via illumination of the surface of the bend formed by the optical fibre. The document does not specify whether the optical fibre is also curved over at its other end.
- According to the method described in document U.S. Pat. No. 5,463 706, close to the preceding method, an optical fibre is used to visualise a cable or conduit. In this document light can be injected laterally at a bend formed on an optical fibre. This bend location lies distant from the ends of the optical fibre resulting in illumination of the optical fibre over its entire length.
- Document EP1261889 describes a visual method to identify a cable or lead also obtained by means of an optical fibre. The optical fibre is integrated at the time of manufacture into the cables or leads. Said optical fibre is curved at its two ends, each end forms a bend embedded in the connector positioned at the corresponding end of the cable or lead. The method described in this document has the same disadvantage as in the preceding examples, namely the need for a light source to inject light into one end of the fibre. In addition, the incorporation or association of an optical fibre with cables significantly increases the cost of the cables to which must be added the cost of a light source module.
- Document WO 2008071867 also describes a visual identification device for cables or conduits whereby the cable or conduit comprises an electroluminescent wire extending along the entire length of the cable or conduit. The electroluminescent wire is designed to be temporarily powered for visualisation of the pathway of the cable or conduit. The device also comprises connection means for electrical powering of the electroluminescent wire, positioned in the vicinity of each of the ends of the cable and hence in the vicinity of the terminal connectors or at an intermediate point. These connection means are independent of the terminal connectors. The electroluminescent wire is either integrated at the time of manufacture of the cable or positioned on the surface. The connection means for powering the electroluminescent wire are in the form of a connector attached to said electroluminescent cable and surround the cable. These powering connectors are designed to cooperate with an adapted power injector. This method has the disadvantage of requiring the positioning of connectors on the electroluminescent wire for the electrical powering of said wire and of requiring an electrical power injector which may be a source of perturbations for the transmitted signal if the cables or conduits are electric cables.

Document U.S. Pat. No. 5,666,453 describes a method to identify the ends of an optical fibre cable. With this method the optical fibre cable is equipped with two ends each comprising a connector for connection to computer or electronic equipment and an electrical power connector comprising a light indicator and electrical power plug. The optical fibre cable also comprises two electrically conductive wires for the power voltages of the light indicators arranged at the two ends of the optical fibre cable, said power voltages being applied by means of an electrical powering device connected onto one of the power connection plugs. The light indicators are light-emitting diodes (LEDs).

Document U.S. Pat. No. 6,577,243 describes a method/device similar to the one described in document U.S. Pat. No. 5,666,453, applied to a twisted pair cable. Two electrically conductive wires of the cable are used for the power voltages applied by means of an external electrical powering device connected to an electrical powering point of the indicators (LED), the indicators and power point being positioned in terminal powering connectors close to the connectors intended for connection to computer or electronic equipment. The main disadvantage of this identification device and of the preceding device is that they cannot be used for present-day networks i.e. for networks having a communication rate of at least 100 Mb/s according to the POE standard and possibly 1000 Mb/s according to the POE+, standard, since in this case all the conductors are used for communication. In both the previously described solutions two conductor wires are dedicated to external powering to activate the identifying device. The functioning of said identifying device would perturb communication if, for the needs of increasing the rate of communication, the wires were also used to convey communication signals.

Another disadvantage of said devices lies in the fact that the ends of the cables are of larger volume than with an ordinary cable. The ends of the cables close to the connectors intended for connection onto computer or electronic equipment are widened due to the presence of a power connector. Yet the room for connections on the sides of equipment is limited, the spacing between connectors on computer equipment being standard; it may simply not be possible to envisage these solutions if a large number of cables are required for an installation. In addition, these solutions require the connecting of an external electrical power source onto the power connector.

SUMMARY OF THE INVENTION

It is therefore the object of the invention to overcome the shortcomings of the prior art by proposing a device for visual cable marking, allowing identification of a cable end irrespective of the number of cables and their arrangement, adapted for network cables allowing high communication rates possibly reaching 100 Mb/s to 1000 Mb/s and preferably possibly reaching 10000 Mb/s (10 Gb/s) without any perturbed functioning.

In addition, the proposed device does not increase the volume taken up by the cable ends as is the case with the devices described in U.S. Pat. Nos. 6, 577,243 and 5,666, 453, and does not require a specific electrical power connector.

For this purpose, there is proposed a cable comprising a device for identification of the ends thereof. At each end the device comprises an electronic circuit comprising a light-emitting diode LED. At least one of the circuits comprises a switch which may or may not be integrated in the LED. The electronic circuits are connected to the cable and arranged such that the switch is able to allow the electrical powering of the circuit at the opposite end, by means of a network power supply conveyed by said cable.

It is therefore not necessary to set aside conductor wires of said cable for this purpose i.e. to power the identification device. It is not necessary either to provide an external power source dedicated to powering the identification device or to stop the functioning of connected systems. The cable can be disconnected at one end whilst the other end remains directly connected via the end connector to power sourcing equipment supplying the network. Therefore, the identification device of the invention is able to function when the cable remains connected via at least one of its ends receiving the network power supply and also when it is connected via both its end to network equipment without causing perturbation of signal transmission.

The subject of the invention is more particularly a network cable comprising wires intended to convey a network power supply, chiefly characterized in that it comprises a device for visual identification of the ends of said cable, comprising a first electronic circuit comprising at least one light-emitting diode and a switch and a second electronic circuit comprising at least one light-emitting diode; both circuits being connected via a conductive link; the first of said electronic circuits being connected to one of the network supply conductor wires to one end of the cable, and the second electronic circuit being connected to another network supply connector wire at the opposite end of said cable, said electronic circuits being arranged such that activation of the switch enables the network power supply to power at least the light-emitting diode of the electronic circuit of opposite end.

According to other optional characteristics:
- at least one of the electronic circuits comprises a circuit to trigger network electrical powering able to be conveyed by the cable;
- the electronic circuits are connected by the conductive link so that the LEDs are connected in series, activation of the switch allowing the passing of power current and illumination of both diodes;
- the first and second electronic circuits comprise a switch, these switches are connected to the LEDs which are powered by activation of either of the switches; power delivery being cut off by deactivating the activated switch;
- the first and second electronic circuits comprise a switch, these switches being connected to the LEDs to allow two-way functioning, LED powering being obtained by activating either switch, and power delivery being cut off by deactivating either of said switches;
- the electronic circuits are incorporated in the cable or advantageously in the cable connectors;
- the circuit triggering network powering is moulded in a cable connector;
- the cable is a cable with twisted pars fitted with RJ45 connectors one of which is intended to be connected to powering equipment of switch type meeting standard POE;
- the identification device is connected to network powering conductors no 4 and/or 5 (DC−) and no 6 and/or 7 (DC+) of the cable;

the conductive link connecting the two electronic circuits is housed in the cable;

the conductive link connecting the two circuits is housed in a sheath attached to the cable;

advantageously the conductive link comprises two or three conductor wires;

the cable is a computer or telephone network cable;

said cable is a plugging cable intended for a computer plugging bay.

A further subject of the invention is a device for the visual identification of the ends of a network cable comprising conductor wires intended to convey network powering, chiefly characterized in that said device comprises at least one first electronic circuit comprising at least one light-emitting diode and a switch, and a second electronic circuit comprising at least one light-emitting diode; both circuits being connected via a conductive link the first of said electronic circuits being connected to one of the network powering conductor wires at one end of the cable and the second electronic circuit being connected to another powering conductor wire at the opposite end of said cable, said electronic circuits being arranged such that activation of the switch enables the network power supply to power at least the light-emitting diode of the electronic circuit of opposite end.

Advantageously at least one of the electronic circuits comprises a circuit to trigger network electrical power delivery able to be conveyed by the cable.

BRIEF DESCRIPTION OF THE DRAWINGS

Other particular aspects and advantages of the invention will become apparent on reading the following description given as an illustrative, non-limiting example with reference to the appended Figures illustrating.

DETAILED DESCRIPTION OF THE INVENTION

The invention advantageously applies to Ethernet network links and advantageously uses power voltages allowing the powering of network equipment in accordance with the POE standard (Power over Ethernet) or IEEE 802.3af standard.

It is recalled that the POE standard (Power Over Ethernet) allows passing of a voltage of 48 V (12 W power and no more than 15.4 W) in addition to data at 100 Mbit/s or 1 Gbit/s. The POE standard relates to the so-called Fast Ethernet network capable of transferring data at a rate of 100 Mbits/s and to the so-called Gigabit Ethernet network capable of transferring data at a rate of 1000 Mbits/s (Gbits/s) and the 10 Gigabit Ethernet network, a latest generation standard POE+; capable of delivering a data rate of 10 Gbits/s (10000 Mbits/s).

In the given example of embodiment, the term "cable" applies to cables with twisted pairs able to be used in computer or telephone networks, and in particular twisted pair cables used in Ethernet networks called cables Cat-5 for the POE standard, Cat-5e for the POE+ standard and Cat-6a or Cat-7 for the latest generation. A cable with twisted pairs is formed of eight wires forming four pairs of twisted copper wires. These cables are equipped with plugs or connectors of RJ-45 type. The maximum cable length of a twisted pair is conventionally 100 m.

Said cable is provided at each end with a network connector of RJ-45 type. A first conductor is intended to be connected to Power Sourcing Equipment (PSE) such as a POE-compatible switch or hub.

By "light-emitting diode" or LED is meant a LED electronic circuit comprising at least one LED diode and optionally an integrated switch. In the remainder hereof the terms LED circuit or LED diode will be used indifferently.

Figure 1:
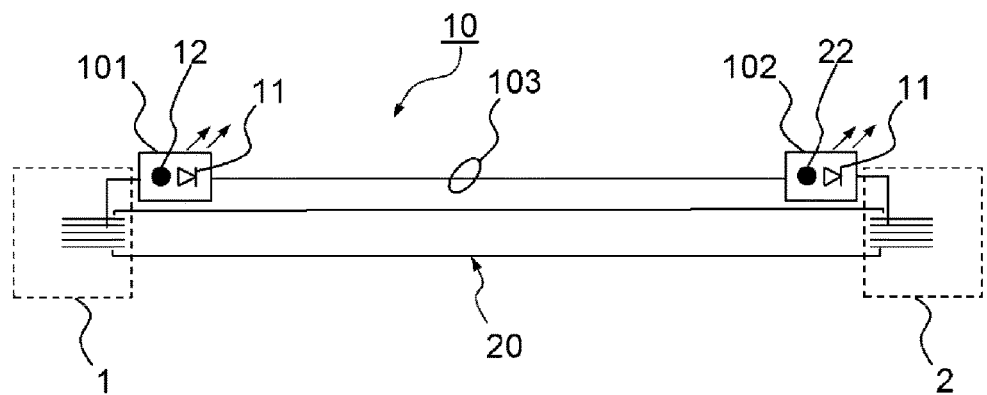
FIG. 1, a schematic of a cable comprising a visual identification device of the invention.

The following description is given with reference to FIG. 1. The cable 20 at each of its ends comprises a connector referenced 1, 2 in the schematics. These connectors are RJ-45 connectors or equivalent. According to the invention, the cable comprises a visual identification device 10. This visual identification device 10 comprises a first electronic circuit 101 at one end, and an electronic circuit 102 at the other end. Both electronic circuits 101 and 102 are connected by a conductive link 103. The conductive link 103 is preferably housed in the cable. It can also be housed in a sheath attached to the cable. The electronic circuits 101, 102 each comprise at least one LED diode 11, 21 and at least one of the circuits comprises a switch 12. Preferably circuit 102 also comprises a switch 22. The presence of a switch in both circuits is not compulsory. However, in the examples of embodiment illustrated FIGS. 1 and 2, each electronic circuit 101 and 102, advantageously comprises a switch. Therefore, for service or maintenance staff the ends of the cables are visually identical. The visual identification device 10 can therefore be activated indifferently by either of the ends of the cable.

The switch 12 or 22 may or may not be integrated in the corresponding light-emitting diode. Advantageous a diode circuit is used comprising an integrated switch.

The circuits 101, 102 are arranged so that on intentional activation by an operator (closure of a switch) this causes illumination of at least the LED diode located at the opposite end. In the examples of embodiment illustrated FIGS. 2 and 3, the arrangement of the two circuits allows illumination of both LED diodes. Therefore, when a circuit is activated at one end, the LED diode at this same is illuminated and the LED diode at the other end is also illuminated. The identification of the cable ends is therefore easily obtained.

Figure 2:
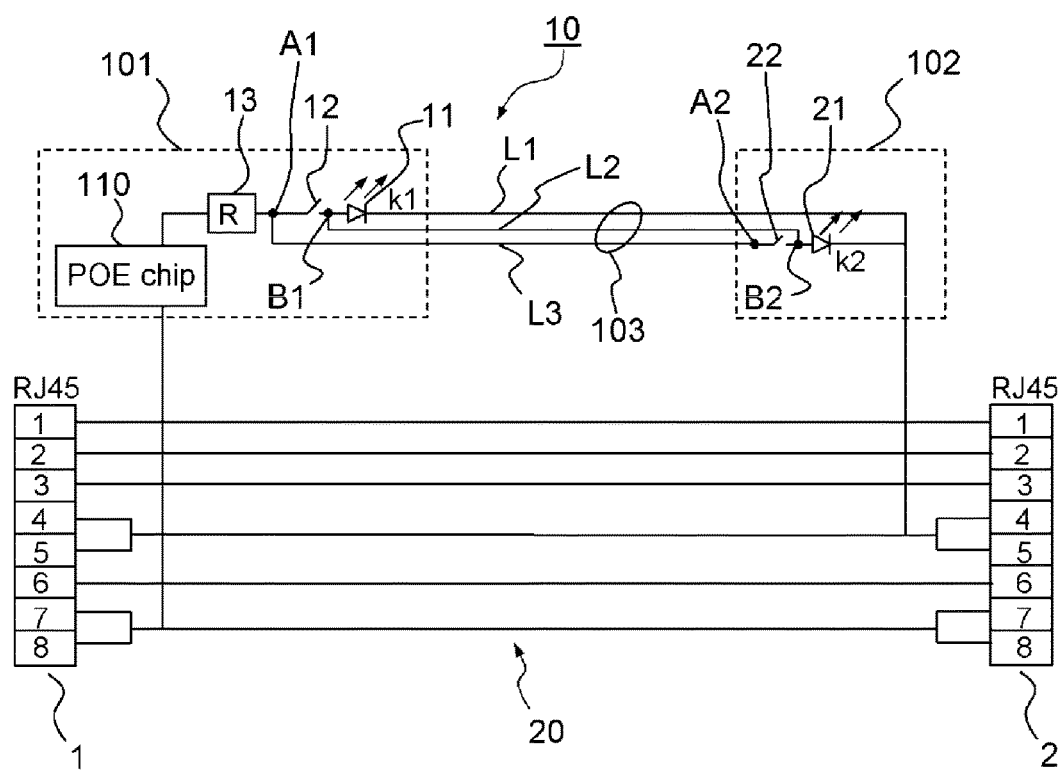
FIG. 2, a schematic of the structure of the identification device according to a first embodiment of the invention.

FIG. 2 illustrates an example of embodiment which allows powering of the diodes after closing of a switch even if the cable is not connected to equipment requiring network powering. In this example the visual identification circuit 10, at a first end corresponding to the end connected to connector 1, comprises electronic circuit 101 and at the end connected to connector 2 comprises electronic circuit 102. The electronic circuit 101 comprises LED 11, a switch 12 and circuit 110 triggering network electrical power delivery via the cable. The electronic circuit 102 comprises a switch 22 and diode LED 21. The electrical power trigger circuit 110 allows activation of network powering mode via the cable and hence powering of the LEDs by intentional action by an operator pressing on a switch.

Advantageously only one of the electronic circuits comprises the electrical powering trigger circuit 110, in this case it is circuit 101. The trigger circuit 110 is an integrated circuit e.g. LM5071 circuit by Texas Instruments, capable of activating the Ethernet network powering mode (POE) on active equipment to which the cable may be connected. Activation of the Ethernet network electrical powering mode causes electrical powering of diode LED 11 in series with the switch 12 closed by an operator, and in this example powering of both diodes LED 11 and 12 in series. The LED diode or diodes in series with the closed switch are therefore illuminated. Activation of the switch of an electronic circuit 101 or 102 causes electrical powering of the LED of the circuit at the opposite end of the cable and in practice powering of both LEDs. Reciprocally, deactivation of the activated switch cuts off electrical power delivery to the LEDs. The LEDs are therefore illuminated or switched off via action on a switch of one of the electronic circuits 101 or 102 and are switched off by deactivating this same switch.

The power delivery trigger circuit 110 is advantageously formed of a POE integrated circuit chip generally provided on equipment requiring powering via an Ethernet link as is the case for example for IP telephony. The function used to detect the need for electrical powering of equipment connected to the other end of the network cable, by power sourcing equipment, is measurement of cable impedance. The presence of the integrated circuit 110 (POE chip) in the identification device 10 allows simulation, when a switch of the identification device is closed, of the presence of equipment requiring network electrical powering and the required voltage. When a switch is closed the impedance of the cable is modified by the presence of the trigger circuit 110, and has a value corresponding to the aforementioned standard and therefore triggers POE network powering via the cable. This powering is supplied by sourcing equipment (not illustrated) to which the cable is connected. When the switch is open impedance is infinite and power is not delivered to the identification device 10.

The electronic circuits 101 and 102 are connected by wires L1, L2, L3 forming link 103 so that via activation of one of the switches 12 or 22 and by means of the network power conveyed by said cable, power is delivered to the light-emitting diodes of the circuits at the opposite end thereby illuminating said light-emitting diodes. Terminal A1 of switch 12 is connected via wire L3 to terminal A2 of switch 22 and terminal B1 of switch 12 is connected via wire L2 to terminal B2 of switch 22. Terminal B1 is connected to the anode of LED 11 and to terminal B2 which is connected to the anode of diode 21. The cathodes K1, K2 of diodes 11 and 22 are connected via wire L1 to a network electrical powering cable wire DC−. The integrated circuit POE is connected to an electrical powering wire DC+ and to a resistance 13 protecting diodes 11 and 21.

Figure 3:
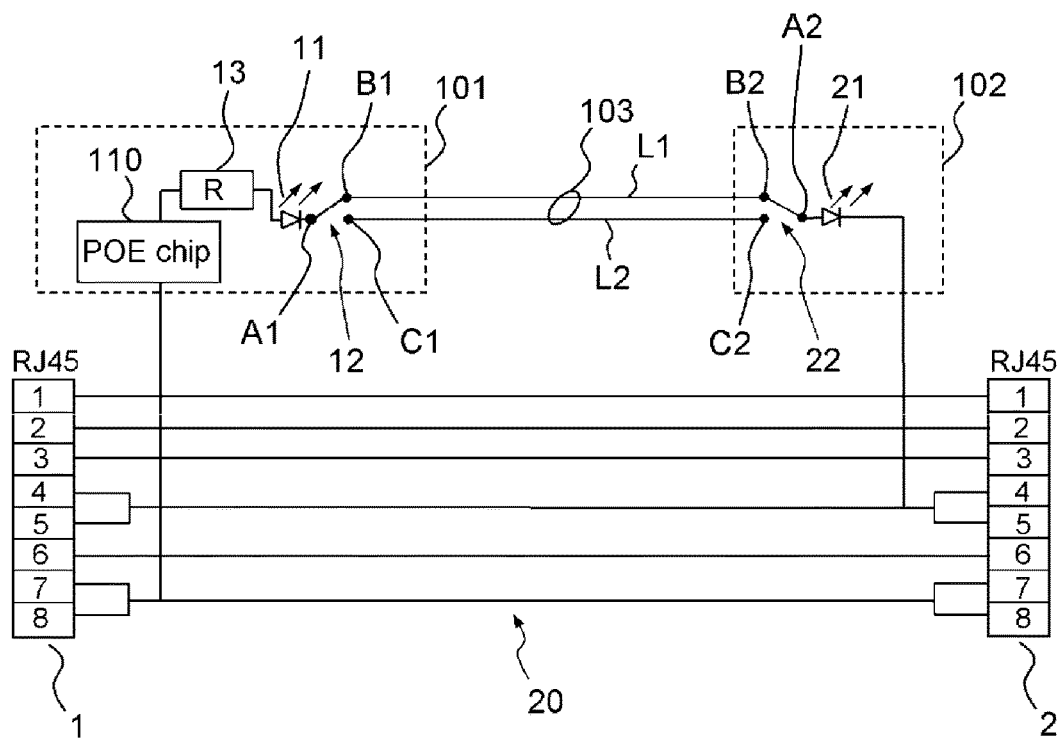
FIG. 3, a schematic of the structure of the identification device according to a second embodiment of the invention.

In the example of embodiment illustrated FIG. 3 the connection of the trigger circuit 110 is unchanged compared with the preceding example. The link 103 between the two electronic circuits 101 and 102 comprises two wires L1 and L2. The switches 12 and 22 have their contacts in reverse position when they are deactivated (rest position). In the schematic, switch 11 has been activated and is in raised position, the contact is at B1 on wire L1 and switch 22 is deactivated, the contact is at position B2 on wire L1. The wire L2 connects the contacts C1 and C2 of the switches. The light-emitting diode 11 is connected between the powering wire and the switch 12, its cathode being connected to point A1 of the contact of switch 12. The light-emitting diode 21 is connected after switch 22, its anode being connected to point A2 of the contact of the switch and its cathode being connected to the powering wire. Therefore, by action on the switch 22, changeover from position B2 to position C2, the powering of the light-emitting diodes is cut off. In this example of embodiment, the powering of the light-emitting diodes can be activated by one of the switches and deactivated by any of the switches. The circuits 101 and 102 form a two-way system. The operating function of the trigger circuit 110 is the same as in the preceding example.

In these examples of embodiment, the cable 20 is a RJ45 cable, the circuit 110 triggering network powering to deliver power to the LEDs is connected to two conductor wires out of the eight conductor wires of the cable compatible with standard POE or POE+ to obtain sufficient electrical intensity for powering of the LED circuits. In the example they are powering conductor wires no 5 (DC−) and no 7 (DC+) of the cable. The activation of one of the two switches on the cable causes illumination of both LEDs.

In all cases by mere activation of the switch accessible to an operator, the latter is able to visualize the other end of the cable.

Preferably the trigger circuit 110 allows powering of the LEDs on and after the time only one of the two ends of the cable is connected to power sourcing equipment (PSE) that is POE or POE+ compatible.

Advantageously, activation of POE+ Ethernet network powering is obtained as follows:
  The powering-up sequence follows a specific scheme meeting the POE standard, namely:
  The power sourcing equipment PSE detects connection of the powered device PD by measuring cable impedance (signature).
  If impedance is between 23.75 kΩ and 26.25 kΩ, the PSE considers that a device to be powered (PD) is present and in the case here it is the identification device 10, when one of the switches is closed;
  The PSE equipment therefore activates POE+ and supplies a direct current to the identification device detected by the presence of the powering trigger circuit 110. The identification device 10 is detected as soon as one of the switches is activated.
Operating procedure is as follows:
State 0: the device on the cable is not powered-up and the LEDs are not illuminated.
State 1: the operator activates the identification device at one of the two ends by pressing on the switch.
  So that the device activates both LEDs, the cable must be connected to power sourcing equipment compatible with POE or POE+, namely either a POE hub or switch.
  If the cable is not connected to a switch the device is not powered.
State 2: Both LEDs are illuminated.
  The operator can easily identify the other end of the cable by means of the illuminated LED. This end may or may not be connected to computer equipment (other switch, computer, printer . . . ).
State 3: the operator switches off the LEDs by deactivating i.e. opening the switch.

Figure 4:
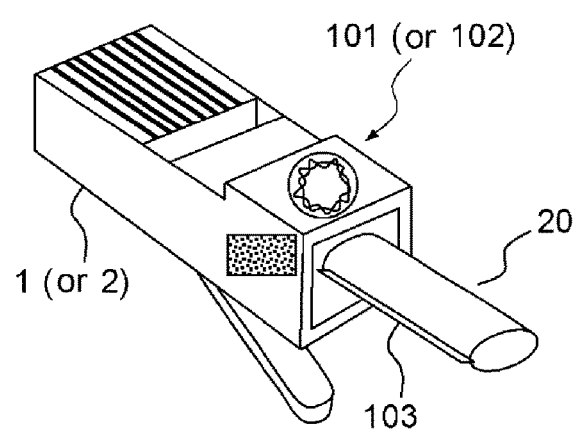
FIG. 4, a schematic of an example of installation of the identification device.

The schematic in FIG. 4 illustrates one embodiment in which the circuits 101 or 102 are housed in the connectors 1, 2. The network powering trigger circuit 110 can advantageously be moulded in a connector.

The cable proposed by the invention comprises a cable end-identifying device that is reliable and does not perturb transmitted signals. In addition, the functioning of the device does not require either an external power source or an additional connector.

The invention claimed is:
1. A network cable, comprising:
wires adapted to convey network electrical power; and
a device for visual identification of the ends of said cable, said device comprising
  a first electronic circuit having at least one light-emitting diode and a switch; and a second electronic circuit having at least one light-emitting diode,
wherein both circuits are connected via a conductive link, said conductive link comprising two or three conductor wires,
the first of said electronic circuits being connected to a first conductor wire of said conductive link at one end of the cable,
the second electronic circuit being connected to a second conductor wire of said conductive link at the opposite end of said cable, said electronic circuits being arranged so that activation of the switch allows the network power source to power at least the light-emitting diode of the electronic circuit of opposite end,
at least one of said electronic circuits comprises an electrical powering trigger circuit capable of activating network electrical powering mode via the cable, said electrical powering trigger circuit being a Ethernet network powering mode integrated circuit capable of activating the Ethernet network powering mode on active equipment to which the cable may be connected, and
conductor wires of said cable conveying network power to deliver power to network equipment according to the Ethernet network powering mode standard or IEEE802.3af standard.

2. The network cable according to claim 1, wherein at least one of the electronic circuits comprises a circuit triggering network electrical powering able to be transferred via the cable.

3. The network cable according to claim 1, wherein the electronic circuits are connected via the conductive link so that the light emitting diodes are connected in series, activation of the switch allowing the passing of power current and illumination of both diodes.

4. The network cable according to claim 1, wherein the first and second electronic circuits comprise a switch, these switches are connected to the light emitting diodes and via activation of one or the other, allow powering of said diodes; power delivery being cut off by deactivating the activated switch.

5. The network cable according to claim 1, wherein the first and second electronic circuits comprise a switch, these switches are connected to the light emitting diodes to allow two-way operation, the powering thereof being obtained by activating either switch and power delivery being cut off by deactivating either of said switches.

6. The network cable according to claim 5, wherein at least one of the electronic circuits comprises a circuit triggering network electrical powering able to be transferred via the cable, and the circuit triggering network powering is moulded in a connector of the cable.

7. The network cable according to claim 1, wherein the electronic circuits are incorporated in the cable or advantageously in the cable connectors.

8. The network cable according to claim 7, wherein the identification device is connected to power source conductor wires no 4 and/or 5 (DC−) and no 6 and/or 7 (DC+) of the cable.

9. The network cable according to claim 1, wherein the cable is a twisted pair cable provided with RJ45 connectors of which one is intended to be connected to switch-type power sourcing equipment meeting standard Ethernet network powering mode.

10. The network cable according to claim 1, wherein the conductive link connecting the two electronic circuits is housed in the cable.

11. The network cable according to claim 1, wherein the conductive link connecting the two circuits is housed in a sheath attached to the cable.

12. The network cable according to claim 1, wherein the conductive link comprises two or three conductor wires.

13. The network cable according to claim 1, wherein the cable is a computer or telephone network cable.

14. The network cable according to claim 1, wherein said cable is a plugging cable intended for a computer plugging bay.

15. A plugging cabinet which comprises computer links formed by network cables comprising a device for visual identification of cable ends according to claim 1.

16. A device for visual identification of the ends of a network cable, comprising:
wires adapted to transfer network electrical power; and
at least one first electronic circuit having at least one light-emitting diode and a switch and a second electronic circuit having at least one light-emitting diode, wherein
both circuits are connected via a conductive link,
the first of said electronic circuits being connected to one of the network power conductor wires at one end of the cable, and
the second electronic circuit being connected to another power conductor wire at the opposite end of said cable, and
said electronic circuits being arranged so that activation of the switch allows the network power source to power at least the light-emitting diode of the electronic circuit of opposite end.

17. The device for visual identification of the ends of a network cable according to claim 16, wherein at least one of the electronic circuits comprises a circuit to trigger network electrical powering able to be conveyed via the cable.

18. A device for visual identification of the ends of a network cable, comprising:
wires adapted to transfer network electrical power; and
at least one first electronic circuit having at least one light-emitting diode and a switch and a second electronic circuit having at least one light-emitting diode, wherein
both circuits are connected via a conductive link, said conductive link comprising two or three conductor wires,
the first of said electronic circuits being connected to a first conductor wire of said conductive link at at one end of the cable, and
the second electronic circuit being connected to a second conductor wire of said conductive link at the opposite end of said cable, and
said electronic circuits being arranged so that activation of the switch allows the network power source to power at least the light-emitting diode of the electronic circuit of opposite end,
at least one of said electronic circuits comprises an electrical powering trigger circuit capable of activating network electrical powering mode via the cable, said electrical powering trigger circuit being a Ethernet network powering mode integrated circuit capable of activating the Ethernet network powering mode on active equipment to which the cable may be connected, and conductor wires of said cable conveying network power to deliver power to network equipment according to the Ethernet network powering mode standard or IEEE802.3af standard.

* * * * *